United States Patent
Coyne

(10) Patent No.: US 6,322,280 B1
(45) Date of Patent: Nov. 27, 2001

(54) OIL SEALED COLLET PIN JOINT

(75) Inventor: Douglas W. Coyne, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/296,100

(22) Filed: Apr. 21, 1999

(51) Int. Cl.[7] ....................................... F16C 11/00
(52) U.S. Cl. ........................... 403/158; 403/370; 403/154
(58) Field of Search ........................ 37/455, 456; 403/31, 403/150, 152, 153, 154, 157, 158, 370, 367, 38, 39, 37

(56) References Cited

U.S. PATENT DOCUMENTS

| | | | |
|---|---|---|---|
| 3,291,494 | * 12/1966 | Hatch et al. . | |
| 3,522,962 | * 8/1970 | Iverson . | |
| 3,554,588 | * 1/1971 | Reinsma et al. . | |
| 3,829,173 | 8/1974 | Stedman | 305/11 |
| 3,841,771 | * 10/1974 | Shankwitz et al. . | |
| 3,923,313 | 12/1975 | Bailey | 277/63 |
| 3,997,274 | * 12/1976 | Iverson . | |
| 4,022,536 | * 5/1977 | Piepho et al. . | |
| 4,096,957 | * 6/1978 | Iverson . | |
| 4,251,182 | * 2/1981 | Schroeder . | |
| 4,507,005 | * 3/1985 | Siewert et al. . | |
| 4,932,478 | * 6/1990 | Jones . | |
| 4,961,667 | * 10/1990 | Reinsma et al . | |
| 5,630,673 | * 5/1997 | Krzywanos et al. . | |
| 5,720,566 | 2/1998 | Allen et al. | 403/38 |
| 5,769,557 | 6/1998 | Beals et al. | 403/162 |

* cited by examiner

*Primary Examiner*—Lynne H. Browne
*Assistant Examiner*—Tomlyne Malcolm
(74) *Attorney, Agent, or Firm*—Haverstock, Garrett & Roberts; Liza J. Meyers

(57) ABSTRACT

A pin joint including a pin having opposite stepped axial ends and an outer surface extending therebetween, the pin being adapted to be supported for pivotal movement in a bearing of a first member such as a lift arm or the like with the opposite stepped axial ends in predetermined axially spaced relation to axial end faces of the bearing. A pair of annular retainers are adapted to be positioned in apertures of brackets or other elements of a second member such as a bucket or other implement and have inner circumferential stepped surfaces defining cavities adapted for cooperatively receiving and engaging the stepped axial ends of the pin, respectively, for positioning the retainers and the pin in predetermined axial relation to the bearing. The present joint further includes a pair of collets adapted to be wedged in the apertures of the brackets between the inner side walls and the retainers, respectively, for holding the retainers and the pin in position without affecting the predetermined axial relationship thereof to the bearing.

7 Claims, 2 Drawing Sheets

OIL SEALED COLLET PIN JOINT

TECHNICAL FIELD

This invention relates generally to pin joints for pivotal connection of work tools to linkages and the like, and more particularly, to a collet type pin joint to provide desired strength and stiffness properties, and which is oil filled to provide long intervals between lubrication requirements.

BACKGROUND ART

Currently, joints used for the pivotal connection of buckets and other work tools to lift arms and other linkages of work machines commonly include collet type joints and flag type joints. Both types of pin joints utilize a sleeve type bearing mounted in a first member, usually the lift arm or other link, and a pin or pin assembly attached to a second member, which is typically the bucket or other work tool. Collet pin joints include tapered collets which are pressed in or frictionally engaged with the second member for securing the pin or pin assembly in position. This makes the collet pin joints the stronger and stiffer of the two types of joints. However, because of the press or frictional fit, it is difficult to control the axial relationship between the collets and the bearing, necessitating the use of seals therebetween which are not sensitive to axial loading. To meet this need, the known collet pin joints are grease lubricated to allow grease seals to be used. But, this requires frequent greasing to avoid seizing, galling and/or breakage. As another limitation, the known collet pin joints use a pin assembly typically provided as a weldment or cartridge, which is not intended for replacement in the field. Flag type pin joints differ from collet pin joints in the use of one or more external members known as flags for retaining the pin or pin assembly within the bearing. This provides consistent axial length control such that oil seals can be used and oil as the lubricant, thus providing the advantage of requiring less frequent lubrication. The pins or pin assemblies of the flag type joints are also easy to remove and replace in the field. However, the flags have been found to be more prone to wear and breakage, resulting in higher than desired incidence of repair.

Thus, what is required is a pin joint that provides the strength and stiffness of a collet pin joint, but the axial length control and long intervals between lubrication and ease of serviceability of the flag type joints.

Accordingly, the present invention is directed to overcoming one or more of the problems as set forth above.

DISCLOSURE OF THE INVENTION

In one aspect of the present invention, an oil sealed collet pin joint or assembly for pivotally connecting a first member of a work implement assembly to a second member thereof, is disclosed. The first member includes an annular bearing having an inner circumferential bearing surface defining a bore having an axis therethrough, a first axial end face at one end of the bore, and a second axial end face at an opposite end thereof. The second member includes first and second brackets or other structural elements defining a space therebetween, each of the brackets having an inner side wall defining an aperture therethrough, the first member being positionable in the space with the bore between the apertures. The present pin joint or assembly includes a pin having opposite stepped axial ends and an outer surface extending therebetween, the pin being adapted to be supported for pivotal or rotational movement in the bore of the first member with the opposite stepped axial ends in predetermined axially spaced relation to the respective axial end faces of the bearing. The present joint or assembly includes a pair of annular retainers, the retainers being adapted to be positioned in the apertures of the brackets and having inner circumferential stepped surfaces defining cavities adapted for cooperatively receiving and engaging the stepped axial ends of the pin, respectively, for positioning the retainers and the pin in predetermined axial relation to the bearing to provide length control. The present joint or assembly further includes a pair of collets adapted to be wedged in the apertures of the brackets between the inner side walls and the retainers, respectively, for holding the retainers and the pin in the predetermined axial relation to the bearing.

According to a preferred aspect of the invention, the present pin joint or assembly is oil filled, including seal members disposed between the retainer members and the axial end faces of the bearing forming sealed conditions therebetween, respectively, and seal members forming sealed conditions between the stepped axial ends of the pin and the retainer members, defining a cavity adapted for receiving the oil between the inner circumferential bearing surface and the outer surface of the pin. The fixed axial relation of the retainer members and the pin to the bearing enables controlling axial loading of the seal members for long life thereof, and the pin assembly can be easily disassembled and reassembled in the field for service, when required.

BEST MODE FOR CARRYING OUT THE INVENTION

Figure 1:
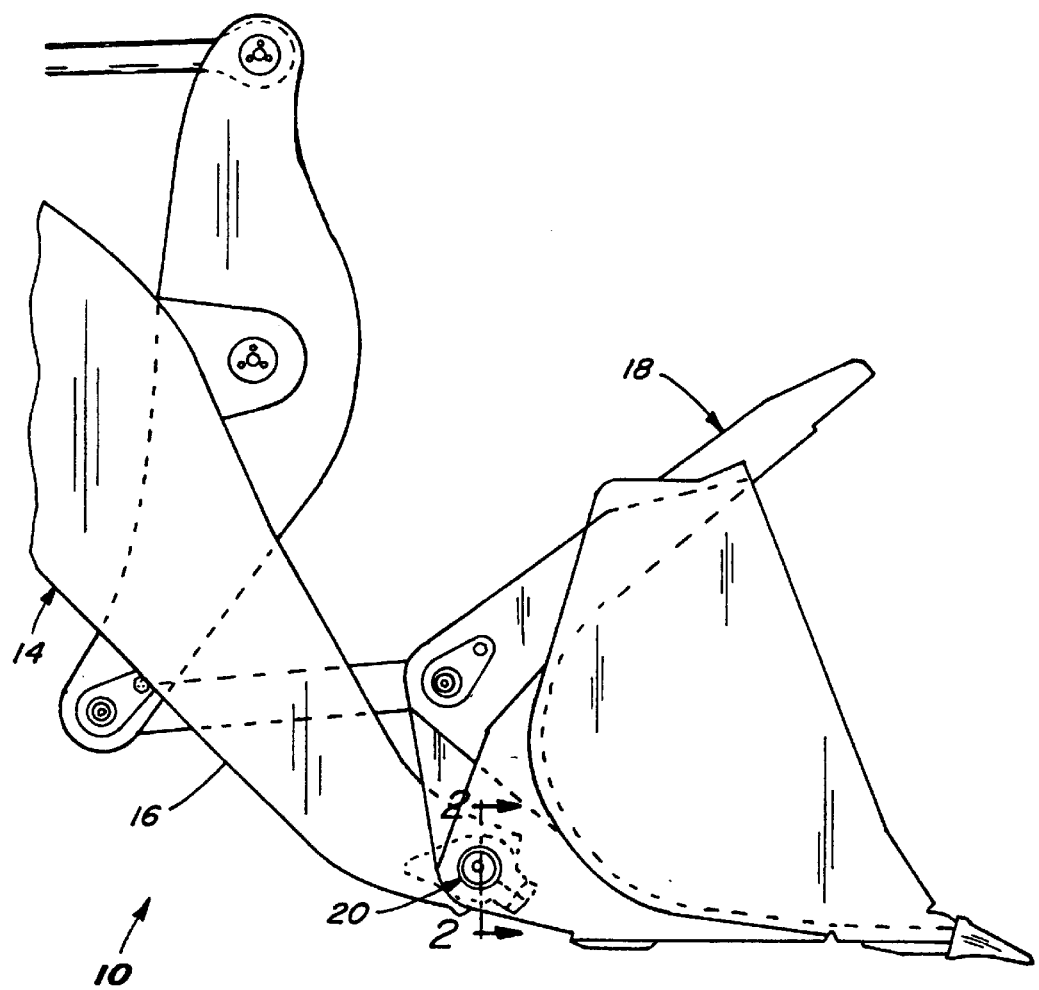
FIG. 1 is a diagrammatic view of a work machine featuring a lift arm assembly including a pin joint of the present invention.

The front end of a work machine, such as a wheel loader 10, is shown in FIG. 1. It should be known and understood that although a wheel loader 10 is used and described herein that any work machine, such as, but not limited to, a material handling machine, may be utilized for the invention hereinafter described. Wheel loader 10 has a structural frame 14 including a pivotally mounted lift arm 16. Lift arm 16 pivotally supports a bucket 18 articulatable for scooping and lifting soil, minerals and other materials, as is well known in the art. Bucket 18 is pivotally connected to lift arm 16 with an oil sealed pin joint 20 constructed and operable according to the teachings of the present invention.

Figure 2:
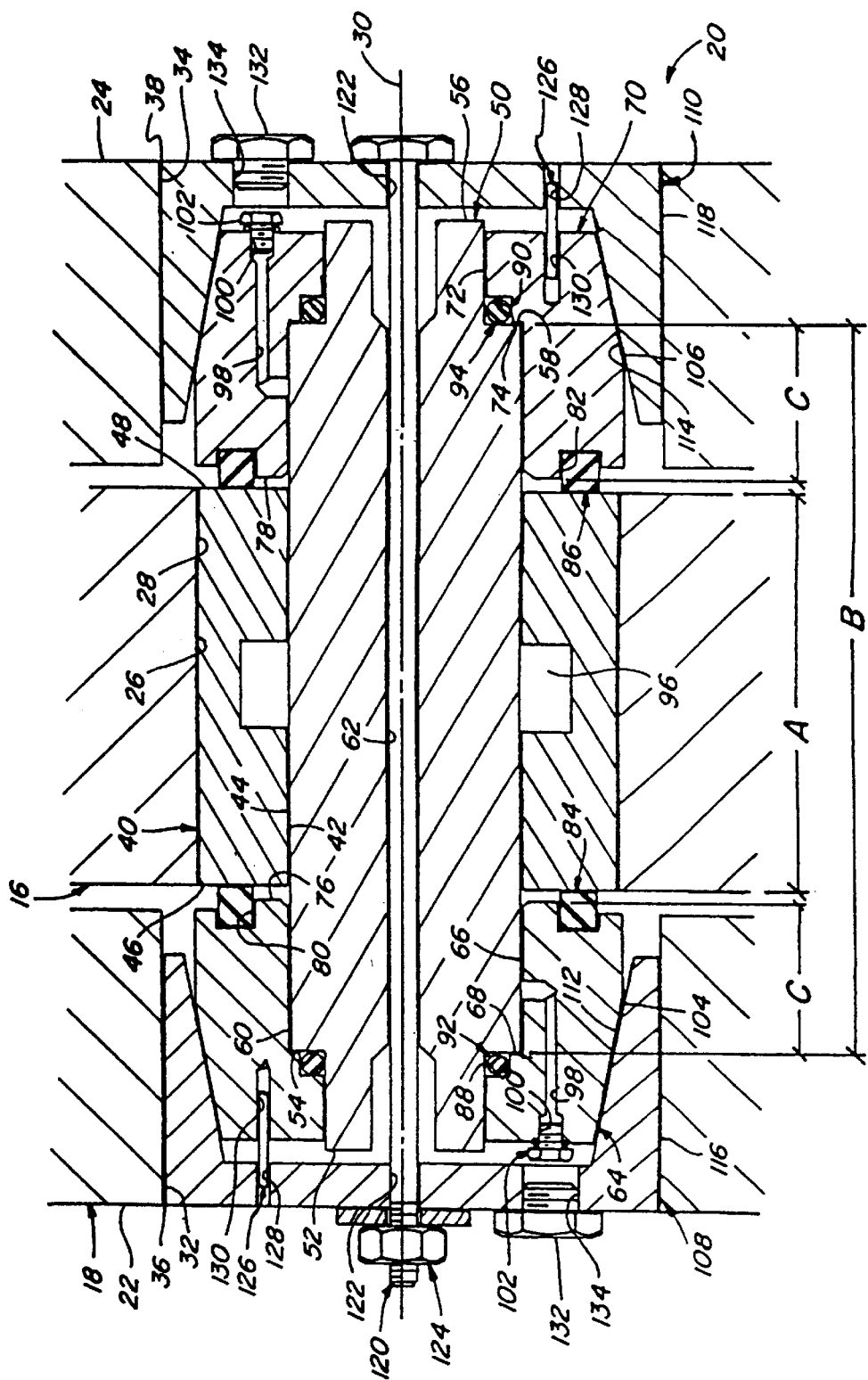
FIG. 2 is a sectional view taken along line 2—2 of FIG. 1.

Referring also to FIG. 2, lift arm 16 is disposed between two brackets 22 and 24 of bucket 18. Lift arm 16 includes an annular bearing seat 26 defining a passage 28 having an axis 30 extending therethrough, and brackets 22 and 24 include inner side walls 32 and 34, respectively, defining apertures 36 and 38 therethrough, apertures 36 and 38 being axially aligned with passage 28. An annular sleeve bearing 40 is pressed fit against bearing seat 26 so as to be retained in passage 28 of arm 16. Bearing 40 includes an inner circumferential surface 42 defining an axially extending bore 44, and first and second outwardly facing axial end faces 46 and 48 on opposite ends of bore 44. Axial end faces 46 and 48 are spaced apart by a predetermined distance, denoted by the letter A.

Pin joint 20 includes an elongate pin 50 supported in bore 44 for relative rotation in bearing 40 about axis 30. Pin 50 includes a first axial stepped end 52 including an annular step 54 extending therearound, and an opposite second axial stepped end 56 having an annular step 58 therearound. Steps 54 and 58 are a predetermined distance denoted by the letter B apart. Pin 50 further includes an outer circumferential surface 60 extending therearound between steps 54 and 58, and a central axial bore 62 therethrough.

Pin joint 20 includes an annular first stepped retainer 64 having an inner circumferential surface 66 including a circumferential step 68, and an annular second stepped retainer 70 having an inner circumferential surface 72 including a circumferential step 74. Stepped retainers 64 and 70 include axial end faces 76 and 78, respectively, which end faces 76 and 78 are located a predetermined distance, denoted by the letter C, from respective steps 58 and 74 of retainers 64 and 70. Axial end faces 76 and 78 include annular grooves 80 and 82 therein, respectively, containing annular face seals 84 and 86.

Retainers 64 and 70 are adapted for cooperatively receiving stepped ends 52 and 56 of pin 50 in overlaying relation thereto with steps 68 and 74 cooperatively engaged with steps 54 and 58, as shown. When retainers 64 and 70 are positioned as shown, axial end faces 76 and 78 of retainers 64 and 70 are positioned in predetermined spaced, opposing relation to axial end faces 46 and 48 of bearing 40, respectively, due to the relationship between distances A, B and C. This relationship is important as it maintains face seals 84 and 86 located in grooves 80 and 82 in predetermined sealed relation with axial end faces 46 and 48 of bearing 40 during the relative rotation between pin 50 and bearing 40. Inner circumferential surfaces 66 and 72 of retainers 64 and 70 additionally include second steps 88 and 90 therearound adapted for forming a sealed condition with O-rings 92 and 94 mounted around steps 54 and 58 of pin 50, respectively, for forming sealed conditions between retainers 64 and 70, and pin 50. Inner circumferential surface 42 of bearing 40, inner circumferential surfaces 66 and 72 of retainers 64 and 70, face seals 84 and 86, and O-rings 92 and 94, form a sealed cavity 96 which is adapted to be filled with oil for lubricating the rotating interfaces of pin joint 20. In this regard, each retainer 64 and 70 includes an oil passage 98 therethrough communicating cavity 96 with a threaded opening 100 plugged with a removable threaded plug 102. Retainer 64 additionally includes an outer circumferential tapered surface 104 and retainer 70 includes an outer circumferential tapered surface 106.

Pin joint 20 additionally includes a first collet 108 and a second collet 110, including inner circumferential tapered surfaces 112 and 114, and outer circumferential cylindrical surfaces 116 and 118, respectively. First and second collets 108 and 110 are adapted to be wedged or positioned in overlaying relation to retainers 64 and 70, respectively, with inner circumferential tapered surfaces 112 and 114 frictionally engaged with outer circumferential tapered surfaces 104 and 106, and outer circumferential cylindrical surfaces 116 and 118 frictionally engaged with inner side walls 32 and 34 of brackets 22 and 24, for retaining pin joint 20 within apertures 36 and 38 of brackets 22 and 24, and bore 44 of bearing 40. A draw bolt 120 extends through axial bore 62 of pin 50 and axial holes 122 through collets 108 and 110 and is threadedly engaged by a threaded nut 124 which can be tightened as desired to achieve the desired degree of frictional engagement for holding retainers 64 and 70 in place, importantly, without changing or otherwise affecting the axial relationship of retainers 64 and 70, and thus face seals 84 and 86, with axial end faces 46 and 48 of bearing 40. This enables the axial loading or thrust forces experienced by face seals 84 and 86 to be controllably limited for providing adequate sealing and long life. More particularly, this enables transferring side loads between lift arm 16 and bucket 18 axially within pin joint 20 via the engaged stepped surfaces, such that the thrust forces on the seal are relatively low. This also prevents rubbing between the lift arm 16 and brackets 22 and 24 of the bucket.

Dowel pins 126 extend through aligned holes 128 and 130 in collets 108 and 110 and retainers 64 and 70, respectively, for preventing relative rotation thereof. Oil plug covers 132 are threadedly engaged in threaded access holes 134 through collets 108 and 110 in alignment with plugs 102, to allow access thereto for filling and draining oil from cavity 96, as required.

Industrial Applicability

The use of collets 108 and 110 for holding the present pin joint 20 together provides a high degree of strength and stiffness and thus reliability. The present collet pin joint can also be easily disassembled, repaired, and reassembled in the field. The controlled axial relationships of retainers 64 and 70, and thus face seals 84 and 86, with bearing 40 enables utilizing oil instead of grease for lubricating the present pin joint, such that the need for lubricating the joint is greatly reduced.

Other aspects, objects and advantages of the present invention can be obtained from a study of the drawings, the disclosure and the appended claims.

What is claimed is:

1. A pin joint, comprising:

a first member including an annular bearing having an inner circumferential bearing surface defining a bore having an axis therethrough, a first axial end face at one end of the bore, and a second axial end face at an opposite end thereof;

a second member including first and second brackets defining a space therebetween, each of the brackets having an inner side wall defining an aperture therethrough, the first member being positionable in the space with the bore between the apertures;

a pin having opposite stepped axial ends and an outer surface extending therebetween, the pin being pivotally supported in the bore of the first member with the opposite stepped axial ends in predetermined axially spaced relation to the respective axial end faces of the bearing;

a pair of annular retainers, the retainers being positioned in the apertures of the brackets and having inner circumferential stepped surfaces defining cavities adapted for cooperatively receiving and engaging the stepped axial ends of the pin, respectively, for positioning the retainers and the pin in predetermined axial relation to the bearing; and a pair of collets being wedged in the apertures of the brackets between the inner side walls and the retainers, respectively, for holding the retainers and the pin in said predetermined axial relation to the bearing.

2. The pin joint of claim 1, further comprising seal members adapted to be disposed between the retainers and the axial end faces of the bearing for forming sealed conditions therebetween, respectively.

3. The pin joint of claim 1, wherein each of the retainers has an outer tapered surface and each of the collets has a tapered inner surface defining a cavity adapted for coopera tively receiving one of the retainers with the inner tapered surface of the collet in frictional engagement with the outer tapered surface of the retainer.

4. The pin joint of claim 1, further comprising at least one draw bolt for wedging the collets in the apertures of the brackets between the inner side walls and the retainers.

5. The pin joint of claim 2, further comprising seal members for forming sealed conditions between the stepped axial ends of the pin and the retainers for sealing a cavity adapted for receiving oil defined between the inner circumferential bearing surface and the outer surface of the pin.

6. The pin joint of claim 5, wherein the second named seal members comprise O-rings.

7. The pin joint of claim 5, wherein at least one of the retainers includes a sealable oil passage communicating with the cavity adapted for receiving oil.

\* \* \* \* \*